(12) United States Patent
Mell

(10) Patent No.: US 7,272,910 B2
(45) Date of Patent: Sep. 25, 2007

(54) ARTIFICIAL HYBRID LURE

(76) Inventor: Troy B. Mell, P.O. Box 678, Islamorada, FL (US) 33036

( * ) Notice: Subject to any disclaimer, the term of this patent is extended or adjusted under 35 U.S.C. 154(b) by 19 days.

(21) Appl. No.: 11/164,707

(22) Filed: Dec. 2, 2005

(65) Prior Publication Data

US 2007/0124984 A1 Jun. 7, 2007

(51) Int. Cl.
*A01K 85/00* (2006.01)
(52) U.S. Cl. .................... 43/42.26; 43/42.24; 43/42.09
(58) Field of Classification Search ............... 43/42.26, 43/42.24, 42.28, 42.29, 42.09; D22/126, D22/127, 132, 133
See application file for complete search history.

(56) References Cited

U.S. PATENT DOCUMENTS

| | | | | |
|---|---|---|---|---|
| 208,581 A | * | 10/1878 | Falvey | 43/42.26 |
| 567,310 A | * | 9/1896 | Gaide | 43/42.28 |
| 885,861 A | * | 4/1908 | Pepper | 43/42.26 |
| 941,911 A | * | 11/1909 | Burthe | 43/42.26 |
| D43,410 S | * | 12/1912 | Pingree | D22/132 |
| 1,247,955 A | * | 11/1917 | Grube | 43/42.26 |
| 1,267,627 A | * | 5/1918 | Campbell | 43/42.26 |
| D55,462 S | * | 6/1920 | Hamilton | D22/132 |
| 1,535,957 A | * | 4/1925 | Stanley et al. | 43/42.29 |
| 1,540,586 A | * | 6/1925 | Adam | 43/42.26 |
| 1,792,366 A | * | 2/1931 | Ettles | 43/42.26 |
| 1,813,722 A | * | 7/1931 | Wright et al. | 43/42.26 |
| D87,050 S | * | 5/1932 | Dunkelberger | 43/42.28 |
| D87,373 S | * | 7/1932 | Weber | D22/128 |
| 1,893,686 A | * | 1/1933 | Schilpp | 43/42.09 |
| 1,908,537 A | * | 5/1933 | Pflueger | 43/42.26 |
| 1,976,695 A | * | 10/1934 | Boehm | 43/42.26 |
| 2,025,270 A | * | 12/1935 | Chaney | 43/42.28 |
| 2,089,605 A | * | 8/1937 | Hardy | 43/42.26 |
| 2,155,335 A | * | 4/1939 | Sleeper et al. | 43/42.46 |
| D121,694 S | * | 7/1940 | Nichols | D22/132 |
| 2,218,280 A | * | 10/1940 | Deering | 43/42.26 |
| 2,290,433 A | * | 7/1942 | Jeffers | 43/42.26 |
| 2,341,999 A | * | 2/1944 | Lennington | 264/226 |
| 2,389,883 A | * | 11/1945 | Worden | 43/42.26 |
| D153,273 S | * | 4/1949 | Frazeur | D22/132 |
| 2,492,064 A | * | 12/1949 | Rauh | 43/42.28 |
| D161,992 S | * | 2/1951 | Amato | D22/133 |
| D163,973 S | * | 7/1951 | Smith | D22/132 |
| 2,597,792 A | * | 5/1952 | Hardy | 43/42.26 |
| 2,619,762 A | * | 12/1952 | Summitt, Sr. | 43/42.26 |
| 2,661,564 A | * | 12/1953 | Weigandt | 43/42.26 |
| 2,718,668 A | * | 9/1955 | Burke | 43/42.24 |
| 2,724,205 A | * | 11/1955 | Howard | 43/42.26 |
| 2,770,063 A | * | 11/1956 | Martin | 43/42.26 |
| 2,785,497 A | * | 3/1957 | Berry | 43/42.26 |
| 2,787,076 A | * | 4/1957 | Kring | D22/132 |

(Continued)

FOREIGN PATENT DOCUMENTS

JP 10-248439 A * 9/1998

(Continued)

*Primary Examiner*—Darren W. Ark
(74) *Attorney, Agent, or Firm*—Malin, Haley & DiMaggio, P.A.

(57) ABSTRACT

An artificial fishing lure resembling both a shrimp tail and a crab. A simulated crab body and legs are attached to the lure through perforations and are removable. The lure without the crab body and legs resembles a shrimp tail.

3 Claims, 3 Drawing Sheets

U.S. PATENT DOCUMENTS

| | | | | |
|---|---|---|---|---|
| 2,793,460 | A | * | 5/1957 | Mutchler ................... 43/42.26 |
| 2,819,553 | A | * | 1/1958 | Fultz ......................... 43/42.26 |
| 3,105,317 | A | * | 10/1963 | Fox ............................ 43/42.26 |
| 3,377,734 | A | * | 4/1968 | Snow ........................ 43/42.24 |
| 3,389,490 | A | * | 6/1968 | Peters et al. ............... 43/42.26 |
| 3,438,144 | A | * | 4/1969 | Lincoln ..................... D22/132 |
| D222,058 | S | * | 9/1971 | Meadows .................. 43/42.26 |
| D228,761 | S | * | 10/1973 | Cunningham .............. D22/132 |
| D231,453 | S | * | 4/1974 | Haggard .................... 43/42.26 |
| D233,603 | S | * | 11/1974 | Bray .......................... D22/132 |
| D233,988 | S | * | 12/1974 | Best ........................... D22/127 |
| 3,940,869 | A | * | 3/1976 | Roberts ..................... 43/42.24 |
| D239,447 | S | * | 4/1976 | Radcliff ..................... 43/42.26 |
| D241,348 | S | * | 9/1976 | Jones et al. ................ D22/126 |
| D243,176 | S | * | 1/1977 | Carver et al. .............. D22/132 |
| D255,593 | S | * | 6/1980 | Hunter ....................... D22/132 |
| 4,307,531 | A | * | 12/1981 | Honse ........................ 43/42.24 |
| 4,316,343 | A | * | 2/1982 | Creme ....................... 43/42.24 |
| 4,429,482 | A | * | 2/1984 | Honse ........................ 43/42.24 |
| 4,516,352 | A | * | 5/1985 | Firmin ....................... 43/42.26 |
| D292,524 | S | * | 10/1987 | Nichols ..................... D22/126 |
| 4,771,567 | A | * | 9/1988 | Cannon ...................... 43/42.26 |
| 4,791,749 | A | * | 12/1988 | Stazo ......................... 43/42.29 |
| 4,799,329 | A | * | 1/1989 | Paulsen ...................... 43/42.28 |
| 4,862,630 | A | * | 9/1989 | Welch ........................ 43/42.26 |
| D305,258 | S | * | 12/1989 | Bybee ........................ D22/132 |
| 4,912,871 | A | * | 4/1990 | Brady ........................ 43/42.26 |
| 4,914,850 | A | * | 4/1990 | Rice ........................... 43/42.24 |
| 4,928,422 | A | * | 5/1990 | Pitre ............................... 43/42 |
| 4,993,183 | A | * | 2/1991 | Carver ....................... 43/42.24 |
| D333,175 | S | * | 2/1993 | Belveal et al. ............. D22/133 |
| 5,209,007 | A | * | 5/1993 | Southerland, Jr. .......... 43/42.09 |
| 5,228,230 | A | * | 7/1993 | Vaught ...................... 43/42.26 |
| 5,261,183 | A | * | 11/1993 | Dworski ..................... 43/42.26 |
| 5,379,544 | A | * | 1/1995 | Davidson ................... 43/42.24 |
| 5,438,790 | A | * | 8/1995 | Rigney ....................... 43/42.24 |
| D363,527 | S | * | 10/1995 | Alexander ................. D22/132 |
| 5,465,523 | A | * | 11/1995 | Garst ......................... 43/42.26 |
| 5,546,694 | A | * | 8/1996 | Wilkinson ................. 43/42.39 |
| 5,625,975 | A | * | 5/1997 | Imes .......................... 43/42.09 |
| 5,630,289 | A | * | 5/1997 | Dotson ...................... 43/42.09 |
| 5,661,921 | A | * | 9/1997 | Mason ....................... 43/42.09 |
| 5,787,634 | A | * | 8/1998 | Way ........................... 43/42.26 |
| 5,894,692 | A | * | 4/1999 | Firmin ....................... 43/42.24 |
| 5,915,944 | A | * | 6/1999 | Strunk ....................... 43/42.26 |
| 5,934,008 | A | * | 8/1999 | Rice ........................... 43/42.26 |
| 5,953,850 | A | * | 9/1999 | Hnizdor ..................... 43/42.26 |
| 5,974,724 | A | * | 11/1999 | Pope .......................... 43/42.26 |
| 6,164,006 | A | * | 12/2000 | Peterson .................... 43/42.09 |
| 6,173,523 | B1 | * | 1/2001 | Johnson ..................... 43/42.26 |
| 6,212,818 | B1 | * | 4/2001 | Huddleston ................ 43/42.26 |
| 6,226,918 | B1 | * | 5/2001 | Rigney ....................... 43/42.24 |
| D457,219 | S | * | 5/2002 | Mooneyham et al. ...... D22/132 |
| D457,592 | S | * | 5/2002 | Hirahara .................... D22/126 |
| 6,405,477 | B1 | * | 6/2002 | Huppert ..................... 43/42.24 |
| D465,544 | S | * | 11/2002 | Brinkman .................. D22/132 |
| D469,153 | S | * | 1/2003 | Gibbs ........................ D22/132 |
| 6,546,663 | B1 | * | 4/2003 | Signitzer et al. ........... 43/42.26 |
| 6,564,499 | B1 | * | 5/2003 | Firmin ....................... 43/42.26 |
| D487,584 | S | * | 3/2004 | Brinkman .................. D22/132 |
| 6,860,058 | B2 | * | 3/2005 | Ito .............................. 43/42.28 |
| D518,140 | S | * | 3/2006 | Firmin ....................... D22/132 |
| 7,114,285 | B1 | * | 10/2006 | Ince ........................... 43/42.26 |
| 7,134,236 | B2 | * | 11/2006 | Chen .......................... 43/42.24 |
| 7,168,203 | B2 | * | 1/2007 | Chambers, Sr. ............ 43/42.28 |
| 2001/0032411 | A1 | * | 10/2001 | Spence ....................... 43/42.24 |
| 2005/0172537 | A1 | * | 8/2005 | Sampson ................... 43/42.28 |
| 2005/0193620 | A1 | * | 9/2005 | King .......................... 43/42.26 |
| 2005/0204607 | A1 | * | 9/2005 | Nichols ..................... 43/42.24 |
| 2005/0235550 | A1 | * | 10/2005 | Oelerich et al. ........... 43/42.26 |
| 2006/0236588 | A1 | * | 10/2006 | Rapelje ...................... 43/42.29 |

FOREIGN PATENT DOCUMENTS

| | | | | |
|---|---|---|---|---|
| JP | 2002-209476 | A | * | 7/2002 |
| JP | 2003-61518 | A | * | 3/2003 |
| JP | 2003-169608 | A | * | 6/2003 |
| JP | 2003-265073 | A | * | 9/2003 |
| JP | 2006-149328 | A | * | 6/2006 |
| JP | 2007-6727 | A | * | 1/2007 |

* cited by examiner

ARTIFICIAL HYBRID LURE

FIELD OF THE INVENTION

The present invention relates generally to fishing lures and, specifically, to an artificial fishing lure shaped to resemble at least two different crustaceans. Each lure can be manually altered if necessary.

DESCRIPTION OF RELATED ART

Sport fishing is a large and growing pastime and industry. There are several different methods of fishing, including the use of live bait and the use of artificial bait or "lures". Different lures are to be used when fishing for different types of fish. Lures in the shape of a crab are quite popular. Lures in the shape of a shrimp are quite popular. While these two animals are both members of the crustacean family, each animal attracts different types of fish and is often used as bait in different types of conditions.

One drawback to using an artificial fishing lure is that when fishing conditions change, often the lure also must be changed. Since an artificial fishing lure resembles a single object or animal, the person fishing must be aware of such changed conditions so that the correct lure to maximize fishing catch is employed. Such changes often require several minutes and can create a missed opportunity to catch a fish.

The prior art has attempted to solve these problems in a variety of ways. For example, U.S. Pat. No. 3,389,490, issued to Peters, et al. is entitled FISHING LURES and teaches of a "solid body of springable thermoplastic material simulating the three dimensional shape of a crayfish". The Peters' patent includes claws, a tail, and hooks which allow the device to resemble a crayfish. However, the device only resembles a crayfish and does not have the ability to be transformed into another animal.

U.S. Pat. No. 4,516,352 issued to Firmin, is entitled ARTIFICIAL CRAWFISH LURE WITH DORSAL AND VENTRAL SEAM and teaches an artificial crawfish lure and hook assembly. The lure has claws, a tail, and a hook such that it resembles a crawfish, which is also known as a crayfish. However, the device only resembles a crawfish and does not have the ability to be transformed into another animal.

U.S. Pat. No. 4,862,630 issued to Welch, is entitled FISHING LURE and teaches an artificial fishing lure shaped and colored like a living crab. The lure has claws, 4 pairs of legs, a central body, and an internal stiffening device. The top of the lure has a green shape, which resembles that of a living crab in order to attract fish. However, the lure only resembles a crab and does not have the ability to be transformed into another animal.

The prior art, therefore, fails to provide an artificial fishing lure which may be transformed between two different animals, thus allowing for the person fishing to fish for the same or different types of fish in different conditions. Accordingly, what is needed in the fishing industry is an improved artificial fishing lure which provides a user with the option of fishing with one type of hybrid bait that can be easily altered manually into a different animal shaped lure.

SUMMARY OF THE INVENTION

An artificial fishing lure, which has the appearance of both a crab and a shrimp and may be altered between the two different crustaceans depending on which type of fish a user desires.

The lure includes a central body which is shaped like the tail of a shrimp. The central body has an elongated cylindrical portion with a flat front end and a flat tail extending from the rear end. Additionally, the lure includes a molded partial shape of a crab attached near the front end of the central body. This molded shape has the appearance of a crab shell and has sides protruding from either side of the central body. The lure further has a plurality of simulated crab legs attached to and extending from the protruding sides of the crab body. There are an equal number of legs on either side.

The lure is molded as a single unitary piece from a thermoplastic. The simulated crab body may include perforation. The perforations allow the crab body to be removed from the central body. When the crab body is attached, each lure has the appearance of a crab and shrimp and can be used to catch fish that eat crabs. When the crab body is manually broken off and removed, the lure has the appearance of a shrimp and can be used to catch fish that eat shrimp. Conversion of the lure from the crab-shrimp shape to the shrimp only shape can be immediate while fishing if fishing conditions merit such a change. There is no need to search for another lure or bait or stock separate lures.

Certainly, one of the purposes of any artificial fishing lure is to create a realistic affect that would provoke fish to believe that the lure is a real creature that could be eaten by the fish. One of the benefits of the present lure by having a hybrid crab-like and shrimp-like body is that the simulated shrimp body and tail in conjunction with the crab legs provide a stability for the lure as it is pulled through the water or as it sits in the water during the active pursuit of catching a fish. It is believed that the distribution and shape of this hybrid lure provides for hydraulic balance and stability during wave motion or motion of the lure through the water during fishing.

The lure is constructed by molding a single piece body of a flexible synthetic material which does not absorb moisture. An example of such a material is plastic, rubber or synthetic rubbers.

It is an object of this invention to provide an artificial fishing lure that includes a hybrid shaped combination of different crustaceans which greatly enhance the ability to catch certain types of fish.

It is another object of this invention to provide a hybrid fishing lure that includes the shape of at least two crustaceans that can be manually altered by removal of certain appendages to obtain the appearance of a single crustacean.

It is yet another object of this invention to provide an artificial fishing lure which using a single lure can provide for a variety of fishing options under different fishing conditions without the need of stocking several different types of lures.

In accordance with these and other objects which will become apparent hereinafter, the instant invention will now be described with particular reference to the accompanying drawings.

DETAILED DESCRIPTION

Figure 1:
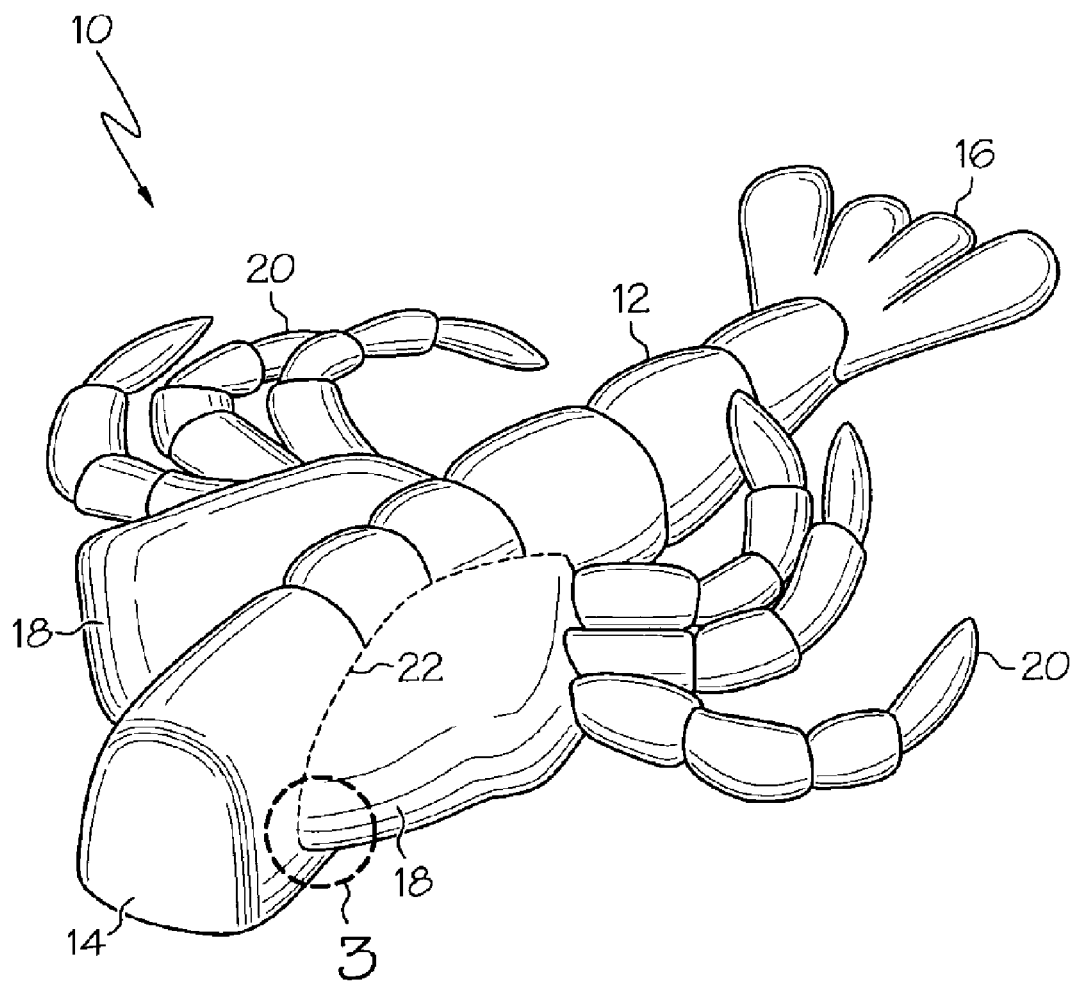
FIG. 1 shows a perspective view of a hybrid lure in accordance with the present invention with the crab body and legs attached through perforation to create the shape of a crab-shrimp hybrid.

Referring to FIG. 1, a fishing lure 10 illustrates the prevent invention. The fishing lure 10 employs a standard crab configuration combines with a simulated shrimp configuration. The lure 10 has a center body section 12 which is elongated and is substantially shaped like a cylinder. The front end 14 of lure 10 is a flat head shaped end face which shows the circumference and area of the center body section 12. At the rear end 16 of the lure 10 is a substantially flat and fanned tail that resembles that of a shrimp. Between the front end 14 and the center body section 12 of lure 10 is a side body lateral extended component 18 which resembles the shell of a crab. The side body component 18 is attached through perforation 22 on the lure 10 with the center body section 12. Along the outer edges of the side body component 18 are a plurality of pairs of simulated crab legs 20 which are shaped to resemble the legs seen on a crab. Because crabs have a total of six legs, it is contemplated that the present invention 10 will also utilize a total of six legs 20. Each leg 20 is integrally molded attached to the side body component 18. The perforation 22 allows a user to manually tear off the side body component 18 easily and cleanly when desired. When the side body 18 is attached, the present invention 10 resembles a hybrid crab-shrimp. When the side body 18 is removed, the present invention 10 resembles a shrimp body and tail. Such easy transformation between different configurations allows a user to quickly change the lure without spending much time or effort. The person fishing need only stock a single lure for different conditions.

Figure 2B:
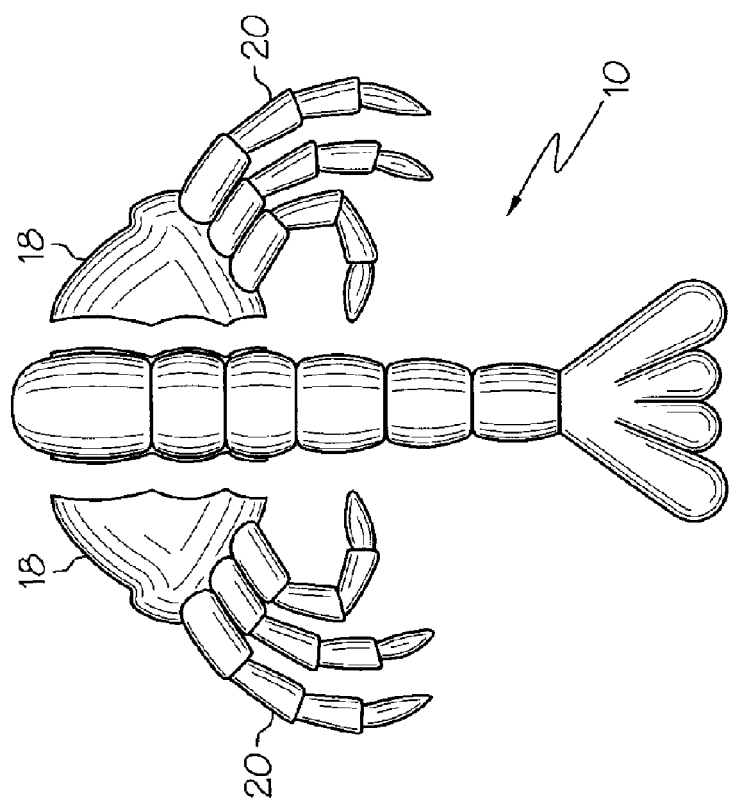
FIG. 2b shows a top plan view of the present invention with the crab body and legs removed to create the shape of a shrimp body and tail.
Figure 2A:
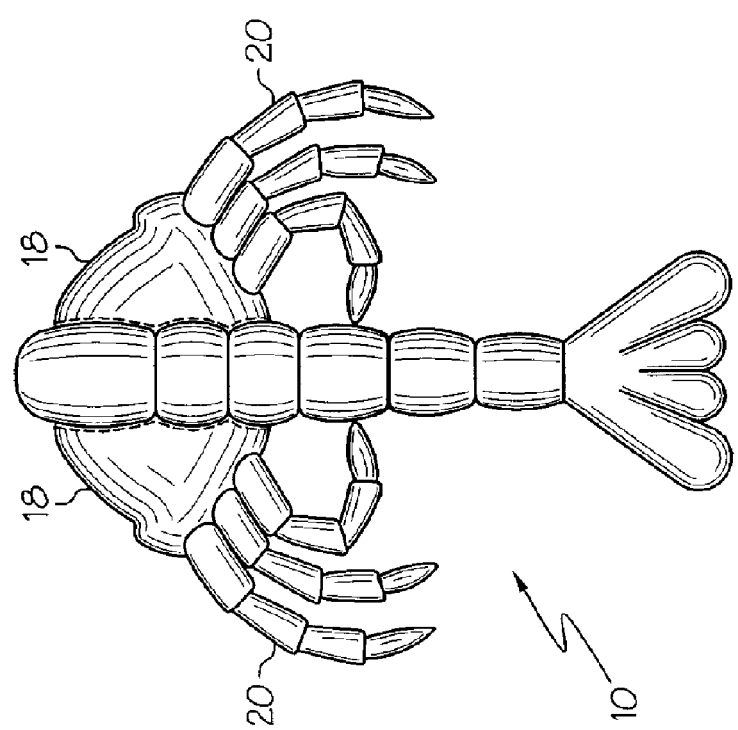
FIG. 2a shows a top plan view of the present invention shown in FIG. 1.

With reference to FIG. 2a, a top plan view of the present invention 10 is shown with the side body component 18 attached such that the natural configuration of a crab is visible and in use.

With reference to FIG. 2b, a top plan view of the present invention 10 is shown with the side body component 18 removed such that the configuration of a simulated shrimp tail is visible and in use.

Figure 3:
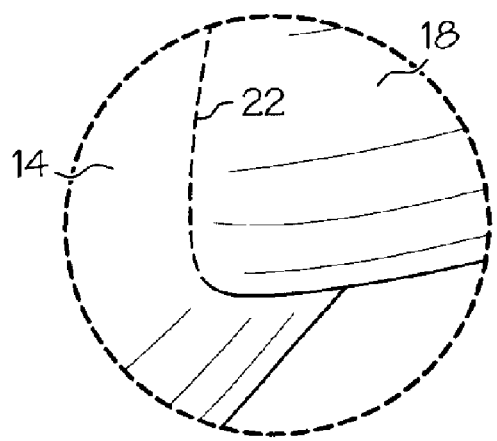
FIG. 3 is an enlarged perspective view of the perforation between the central body and crab body.

With reference to FIG. 3, an enlarged perspective view of the central body 12 and side body 18 connection having a perforation 22 which connects the side body 18 to the central body 12 is shown. Such connection perforations 22 has one or more openings along the central body 12. This makes the process of manually removing the side body components 18 from the central body 12 component easier to tear.

Figure 4:
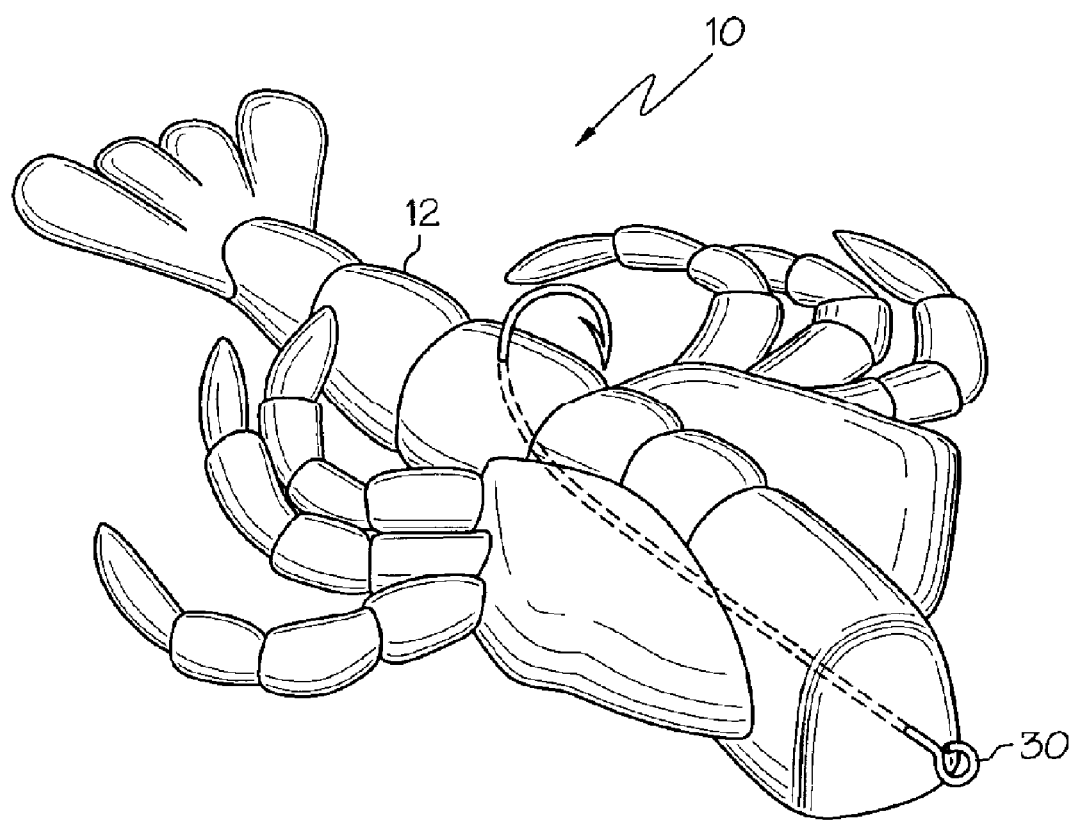
FIG. 4 shows a perspective view of a hybrid lure in accordance with the present invention with the crab body and legs attached and including a fishing hook inserted through the body of the lure.

With reference to FIG. 4, a perspective view of the present invention 10 is shown with a fishing hook 30 inserted through the center body section 12. The fishing hook 30 will allow a user to more easily catch a fish which tries to eat the present invention 10.

The applicant has determined that using the hybrid crustacean lure simulating a crab combined with a shrimp body and tail was extremely successful in catching fish, especially red fish, snook, trout and tarpon. The lure was also effective as a shrimp lure with the legs removed.

Referring to the drawings, it can be seen that the elongated simulated shrimp body and shrimp tail in conjunction with the simulated crab body and legs provide hydraulic surfaces that can add in water stability to the lure as it is being moved through the water on a line while, at the same time, providing a disguise for a hook that is engrossed inside the lure body hiding the bulk of the hook from the fish.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A fishing lure attachable to a fish hook that has the capability of being a simulated crab configuration or a simulated shrimp configuration comprising:

an elongated center body member of a flexibly resilient non-absorbing thermoplastic material that has been molded and conformed in three dimensions to simulate the body and tail portion of a shrimp;

said center body member also having a flat front end, and said simulated shrimp tail portion extending from a rear end of said center body member;

said center body member including a first side body component of flexibly resilient non-absorbing thermoplastic material attached to a right side of said center body member conformed in three dimensions to simulate an elongated extended body portion of a crab that includes a plurality of simulated crab legs extending therefrom, said first side body component being molded and attached to said center body member by a first pattern of perforations that allow the first side body component to be manually removed by tearing away from said center body member; and a second side body component of flexibly resililent non-absorbing thermoplastic material attached to a left side of said center body member conformed in three dimensions to simulate an elongated extended body portion of a crab that includes a plurality of simulated crab legs extending therefrom, said second side body component being molded and attached to said center body member by a second pattern of perforations that allow the second side body component to be manually removed by tearing away from the center body member thereby permitting the simulated crab legs and extended crab body portions of said first body side component and said second body portion for being permanently removed from the center body member and leaving said center body member being shaped like a shrimp.

2. A fishing lure as in claim 1, wherein said first body component includes at least three extending simulated crab legs and said second body component includes at least three extending simulated crab legs.

3. A fishing lure as in claim 1, wherein:

said simulated shrimp tail portion is horizontally disposed relative to said elongated center body member to stabilize the movement of the lure through the water.

* * * * *